United States Patent
Fuso et al.

(10) Patent No.: US 10,190,483 B2
(45) Date of Patent: Jan. 29, 2019

(54) METHOD OF CONTROLLING A PRESSURE RATIO IN A FLOW OF COMPRESSED COMBUSTION AIR

(71) Applicant: GM GLOBAL TECHNOLOGY OPERATIONS LLC, Detroit, MI (US)

(72) Inventors: Rocco Fuso, Turin (IT); Francesco Di Gennaro, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 15/359,858

(22) Filed: Nov. 23, 2016

(65) Prior Publication Data

US 2018/0142611 A1 May 24, 2018

(51) Int. Cl.
| F02B 37/04 | (2006.01) |
| F02B 37/12 | (2006.01) |
| F02B 39/10 | (2006.01) |
| F02B 39/16 | (2006.01) |
| F02D 41/00 | (2006.01) |
| F02D 41/26 | (2006.01) |
| F02D 41/10 | (2006.01) |
| F02D 41/12 | (2006.01) |

(52) U.S. Cl.
CPC ............ *F02B 37/04* (2013.01); *F02B 37/12* (2013.01); *F02B 39/10* (2013.01); *F02B 39/16* (2013.01); *F02D 41/0007* (2013.01); *F02D 41/10* (2013.01); *F02D 41/12* (2013.01); *F02D 41/26* (2013.01)

(58) Field of Classification Search
CPC .......... F02B 37/04; F02B 37/12; F02B 39/10; F02B 39/16; F02D 41/0007; F02D 41/10; F02D 41/12; F02D 41/26; F02M 26/08; F02M 26/15; F02M 26/23
USPC ........................................ 60/601, 605.2, 609
See application file for complete search history.

(56) References Cited

U.S. PATENT DOCUMENTS

| 2006/0207252 | A1* | 9/2006 | Isobe ...................... F02D 23/02 60/601 |
| 2016/0076438 | A1* | 3/2016 | Tabata ................... F02M 26/01 60/602 |
| 2016/0265422 | A1* | 9/2016 | Yamashita .............. F02B 37/18 |
| 2016/0281652 | A1* | 9/2016 | Takasu ................ F02D 41/0065 |
| 2016/0305353 | A1* | 10/2016 | Sase ...................... F02B 37/013 |
| 2016/0348578 | A1* | 12/2016 | Oyagi ..................... F02B 39/16 |
| 2016/0363043 | A1* | 12/2016 | Hirayama .............. F02D 41/10 |
| 2017/0044971 | A1* | 2/2017 | Racca ..................... F02B 37/14 |
| 2017/0145905 | A1* | 5/2017 | Yamane .................. F02B 37/04 |

(Continued)

*Primary Examiner* — Jason Newton
(74) *Attorney, Agent, or Firm* — Quinn IP Law

(57) ABSTRACT

A method of controlling an engine system, having both an electric driven compressor and an exhaust driven turbocharger for compressing a flow of combustion air for an internal combustion engine, includes defining a total pressure ratio target for the flow of combustion air, and defining a distribution factor to calculate a first portion of the total pressure ratio target and a second portion of the total pressure ratio target. The sum of the first portion of the total pressure ratio target and the second portion of the total pressure ratio target is equal to the total pressure ratio target. The electric driven compressor is controlled to provide the first portion of the total pressure ratio target, and the exhaust driven turbocharger is controlled to provide the second portion of the total pressure ratio target.

20 Claims, 3 Drawing Sheets

(56) References Cited

U.S. PATENT DOCUMENTS

| | | | |
|---|---|---|---|
| 2017/0145906 A1* | 5/2017 | Tomita | F02D 41/18 |
| 2017/0328272 A1* | 11/2017 | Yamashita | F02B 37/24 |
| 2018/0038273 A1* | 2/2018 | Iwatani | F02B 37/004 |
| 2018/0051638 A1* | 2/2018 | Wang | F02B 37/04 |
| 2018/0051639 A1* | 2/2018 | Wang | F02D 41/0007 |
| 2018/0100456 A1* | 4/2018 | Yokono | F02B 37/004 |

\* cited by examiner

US 10,190,483 B2

METHOD OF CONTROLLING A PRESSURE RATIO IN A FLOW OF COMPRESSED COMBUSTION AIR

INTRODUCTION

The disclosure generally relates to an engine system having both an electric driven compressor and an exhaust driven turbocharger for compressing a flow of combustion air for an internal combustion engine, and a method of controlling the engine system.

Internal combustion engines mix a flow of combustion air with a fuel, and then combust the fuel/air mixture in a combustion chamber to generate power. The combustion of the fuel/air mixture generates a flow of exhaust gas. The flow of combustion air may be compressed prior to being mixed with the fuel to increase power output from the internal combustion engine. An exhaust driven turbocharger uses the flow of exhaust gas from the internal combustion engine to drive a turbine, which in turn drives a compressor to compress the flow of combustion air. An electric driven compressor uses an electric device, such as an electric motor, to drive a compressor to compress the flow of combustion air.

SUMMARY

A method of controlling an engine system is provided. The engine system includes both an electric driven compressor and an exhaust driven turbocharger for compressing a flow of combustion air for an internal combustion engine. The method includes defining a total pressure ratio target for the flow of combustion air, and defining a distribution factor to calculate a first portion of the total pressure ratio target and a second portion of the total pressure ratio target. The sum of the first portion of the total pressure ratio target and the second portion of the total pressure ratio target is equal to the total pressure ratio target. The electric driven compressor is controlled to provide the first portion of the total pressure ratio target, and the exhaust driven turbocharger is controlled to provide the second portion of the total pressure ratio target.

The method of controlling the engine system may further include continuously re-defining the distribution factor during a transient vehicle operating condition. The transient vehicle operating condition includes redefining the total pressure ratio target. The first portion of the total pressure ratio target and the second portion of the total pressure ratio target are recalculated for each re-defined value of the distribution factor.

In one aspect of the method of controlling the engine system, defining the distribution factor is further defined as defining the distribution factor to have a value equal to or greater than zero, and equal to or less than one. The distribution factor has a first limit equal to a value of one, and a second limit equal to a value of zero. The total pressure ratio target provided at the end of a transient vehicle operating condition is delivered by the exhaust driven turbocharger when the distribution factor has a value equal to one. The total pressure ratio target provided at the end of a transient vehicle operating condition is delivered by the electric driven compressor when the distribution factor has a value equal to zero.

In another aspect of the method of controlling the engine system, the second portion of the total pressure ratio target is calculated from Equation 1) below.

$$\beta_2 = \mu \cdot \beta_{tot} + 1 - \mu \qquad 1)$$

Referring to Equation 1, $\beta_2$ is the second portion of the total pressure ratio target provided by the exhaust driven turbocharger, $\beta_{tot}$ is the total pressure ratio target, and $\mu$ is the distribution factor.

In another aspect of the method of controlling the engine system, the first portion of the total pressure ratio target is calculated from Equation 2) below.

$$\beta_1 = \frac{\beta_{tot}}{\beta_{act}} \qquad 2)$$

Referring to Equation 2, $\beta_1$ is the first portion of the total pressure ratio target provided by the electric driven compressor, $\beta_{tot}$ is the total pressure ratio target, and $\beta_{act}$ is the current pressure ratio being provided by the exhaust driven turbocharger.

In another aspect of the method of controlling the engine system, the method may further comprise determining a target minimum value for the distribution factor. Defining the distribution factor may further include defining the distribution factor to include a value equal to or greater than the target minimum value for the distribution factor. Determining the target minimum value for the distribution factor may include determining a maximum possible pressure ratio from the electric driven compressor for a current air flow through the electric driven compressor, by referencing a table that relates air flow through the electric driven compressor to the maximum possible pressure ratio from the electric driven compressor.

In another aspect of the method of controlling the engine system, the target minimum value for the distribution factor is calculated from Equation 3) below.

$$\mu_{min} = \frac{\frac{\beta_{tot}}{\beta_{max}} - 1}{\beta_{tot}} \qquad 3)$$

Referring to Equation 3, $\mu_{min}$ is the target minimum value for the distribution factor, $\beta_{tot}$ is the total pressure ratio target, and $\beta_{max}$ is the maximum possible pressure ratio from the electric driven compressor for the current air flow through the electric driven compressor.

An engine system is also provided. The engine system includes an internal combustion engine that is operable to mix a flow of combustion air with a fuel, and generate a flow of exhaust gas from combustion of the combustion air and fuel mixture. The engine system further includes an electric driven compressor and an exhaust driven turbocharger. The electric driven compressor is operable to use electric power to compress the flow of combustion air. The exhaust driven turbocharger is operable to use the flow of exhaust gas to compress the flow of combustion air. The engine system further includes an engine control unit. The engine control unit includes a processor and a memory having a combustion air control module saved thereon. The processor is operable to execute the combustion air control module to control the electric driven compressor and the exhaust driven turbocharger. In one embodiment, the combustion air control module is operable to define a total pressure ratio target for the flow of combustion air, and define a distribution factor to calculate a first portion of the total pressure ratio target and a second portion of the total pressure ratio target. The sum of the first portion of the total pressure ratio target and the second portion of the total pressure ratio target is equal to the total pressure ratio target. The combustion air control module controls the electric driven compressor to provide the first portion of the total pressure ratio target, and controls the exhaust driven turbocharger to provide the second portion of the total pressure ratio target.

In one aspect of the engine system, the combustion air control module is operable to define the distribution factor to have a value equal to or greater than zero, and equal to or less than one. The distribution factor has a first limit equal to a value of one, and a second limit equal to a value of zero. The total pressure ratio target provided at the end of a transient vehicle operating condition is delivered by the exhaust driven turbocharger when the distribution factor has a value equal to one. The total pressure ratio target provided at the end of a transient vehicle operating condition is delivered by the electric driven compressor when the distribution factor has a value equal to zero.

In another aspect of the engine system, the combustion air control module is operable to calculate the second portion of the total pressure ratio target from Equation 1) below.

$$\beta_2 = \mu \cdot \beta_{tot} + 1 - \mu \quad \quad 1)$$

Referring to Equation 1, $\beta_2$ is the second portion of the total pressure ratio target provided by the exhaust driven turbocharger, $\beta_{tot}$ is the total pressure ratio target, and $\mu$ is the distribution factor.

In another aspect of the engine system, the combustion air control module is operable to calculate the first portion of the total pressure ratio target is calculated from Equation 2) below.

$$\beta_1 = \frac{\beta_{tot}}{\beta_{act}} \quad \quad 2)$$

Referring to Equation 2, $\beta_1$ is the first portion of the total pressure ratio target provided by the electric driven compressor, $\beta_{tot}$ is the total pressure ratio target, and $\beta_{act}$ is the current pressure ratio being provided by the exhaust driven turbocharger.

In yet another aspect of the engine system, the combustion air control module is operable to determine a target minimum value for the distribution factor by referencing a table saved in the memory of the engine control unit, which relates air flow through the electric driven compressor to the maximum possible pressure ratio from the electric driven compressor, to determine a maximum possible pressure ratio from the electric driven compressor for a current air flow through the electric driven compressor.

The combustion air control module may calculate the target minimum value for the distribution factor from Equation 3) below.

$$\mu_{min} = \frac{\frac{\beta_{tot}}{\beta_{max}} - 1}{\beta_{tot}} \quad \quad 3)$$

Referring to Equation 3, $\beta_{min}$ is the target minimum value for the distribution factor, $\beta_{tot}$ is the total pressure ratio target, and $\beta_{max}$ is the maximum possible pressure ratio from the electric driven compressor for the current air flow through the electric driven compressor.

Accordingly, both the electric driven compressor and the exhaust driven turbocharger may be used in combination to provide the total pressure ratio target, i.e., boost, for the flow of combustion air for both transient conditions as well as steady state conditions. The amount of the flow of combustion air contributed by each of the electric driven compressor and the exhaust driven turbocharger is determined by the distribution factor, which may be defined and recalculated to achieve a specific goal, such as but not limited to maximum performance, minimal $CO_2$ emissions, maximum fuel efficiency, etc. As such, the electric drive compressor is controlled to not only alleviate turbo lag from the exhaust driven compressor, but to also operate as a steady state machine to optimize performance of the engine system and ensure that the required boost in the combustion air is provided for all operating conditions.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
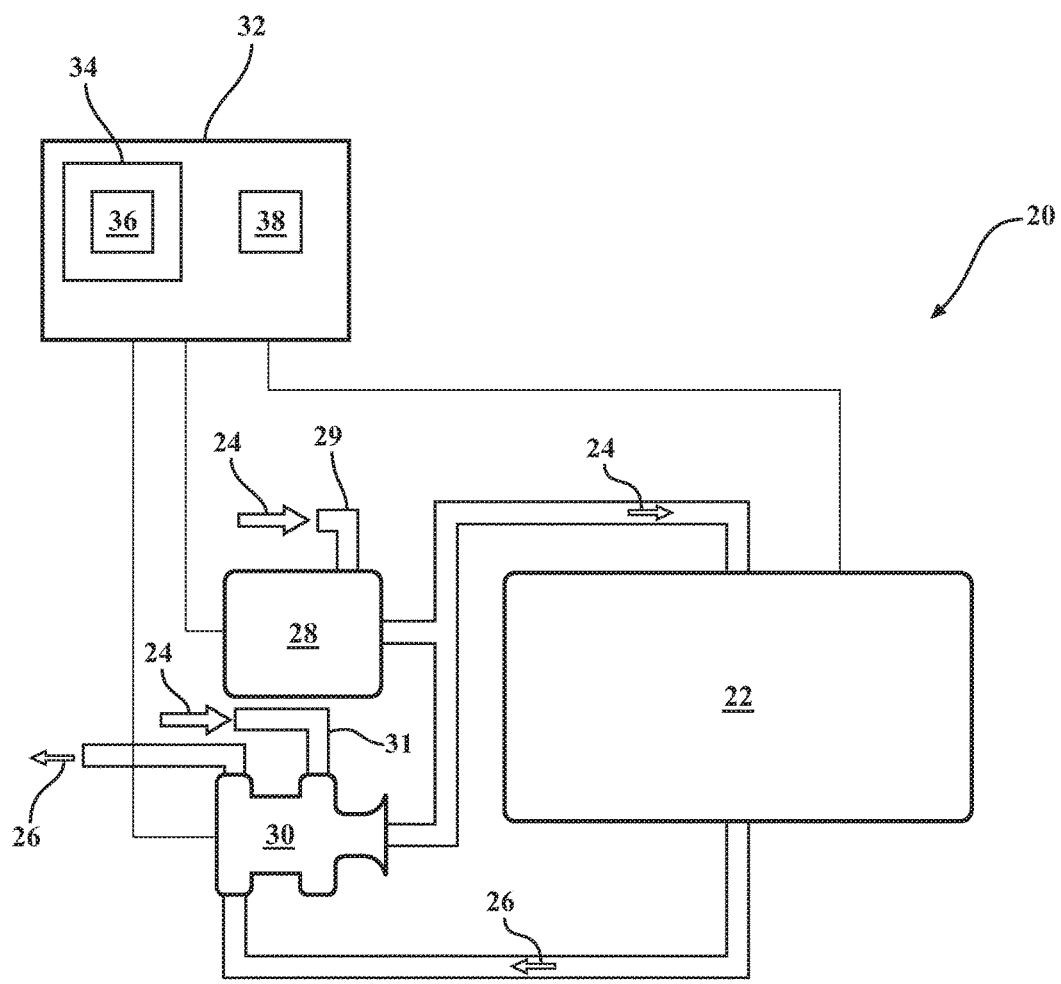
FIG. 1 is a schematic plan view of an engine system.

Referring to the FIGS., wherein like numerals indicate like parts throughout the several views, an engine system is generally shown at 20 in FIG. 1. Referring to FIG. 1, the engine system 20 includes an internal combustion engine 22. The internal combustion engine 22 operates as known to those skilled in the art. The internal combustion engine 22 mixes a flow of combustion air 24 with a fuel, and combusts the fuel/air mixture in a combustion chamber. Combustion of the fuel/air mixture generates a flow of exhaust gas 26 as is known. The specific design and operation of the internal combustion engine 22 is not pertinent to the teachings of this disclosure, and are therefore not described in detail herein. The internal combustion engine 22 may be configured in any suitable manner capable of providing the required power for its intended purpose.

The engine system 20 includes an electric driven compressor 28 and an exhaust driven compressor, e.g., an exhaust driven turbocharger 30. The electric driven compressor 28 includes a combustion air inlet 29, and uses an electric device, such as but not limited to an electric motor, to turn a compressor. The electric driven compressor 28 is operable to compress the flow of combustion air 24 prior to being mixed with the fuel. The electric driven compressor 28 may be configured in any suitable manner capable of providing the required amount of boost for operation of the internal combustion engine 22. The specific design and operation of the electric driven compressor 28 is not pertinent to the teachings of this disclosure, and are therefore not described in detail herein.

The exhaust driven turbocharger 30 uses the flow of exhaust gas 26 to turn a turbine, which in turn turns a compressor. The exhaust driven turbocharger 30 includes a combustion air inlet 31, and is operable to compress the flow of combustion air 24 prior to being mixed with the fuel. The exhaust driven turbocharger 30 may be configured in any suitable manner capable of providing the required amount of boost for operation of the internal combustion engine 22. The specific design and operation of the exhaust driven turbocharger 30 is not pertinent to the teachings of this disclosure, and are therefore not described in detail herein.

The engine system 20 may further include a controller 32 for controlling the operation of the internal combustion engine 22, the electric driven compressor 28, and the exhaust driven turbocharger 30. The controller 32 may be referred to as a computer, a control module, e.g., an engine control module, a control unit, e.g., an engine control unit, or by some other similar name. The controller 32 may include a computer and/or processor 38, and include all software, hardware, memory, algorithms, connections, sensors, etc., necessary to manage and control the operation of the internal combustion engine 22, the electric driven compressor 28, and the exhaust driven turbocharger 30. As such, a method, described below and generally shown in FIG. 2 at 50, may be embodied as a program or algorithm operable on the controller 32. It should be appreciated that the controller 32 may include any device capable of analyzing data from various sensors, comparing data, making the necessary decisions required to control the operation of the internal combustion engine 22, the electric driven compressor 28, and the exhaust driven turbocharger 30, and executing the required tasks necessary to control the operation of the internal combustion engine 22, the electric driven compressor 28, and the exhaust driven turbocharger 30.

The controller 32 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller 32 includes a tangible non-transitory memory 34 having computer executable instructions recorded thereon, including a combustion air control module 36. The controller 32 further includes a processor 38 that is operable to execute the combustion air control module 36 to determine the amount of boost, i.e., compressed combustion air, that each of the electric driven compressor 28 and the exhaust driven turbocharger 30 are commanded to provide. The controller 32 is also operable to control the electric driven compressor 28 and the exhaust driven turbocharger 30 to provide the commanded boost from each. The combustion air control module 36 uses the data from vehicle sensor(s) to determine the desired control of the electric driven compressor 28 and the exhaust driven turbocharger 30.

Figure 2:
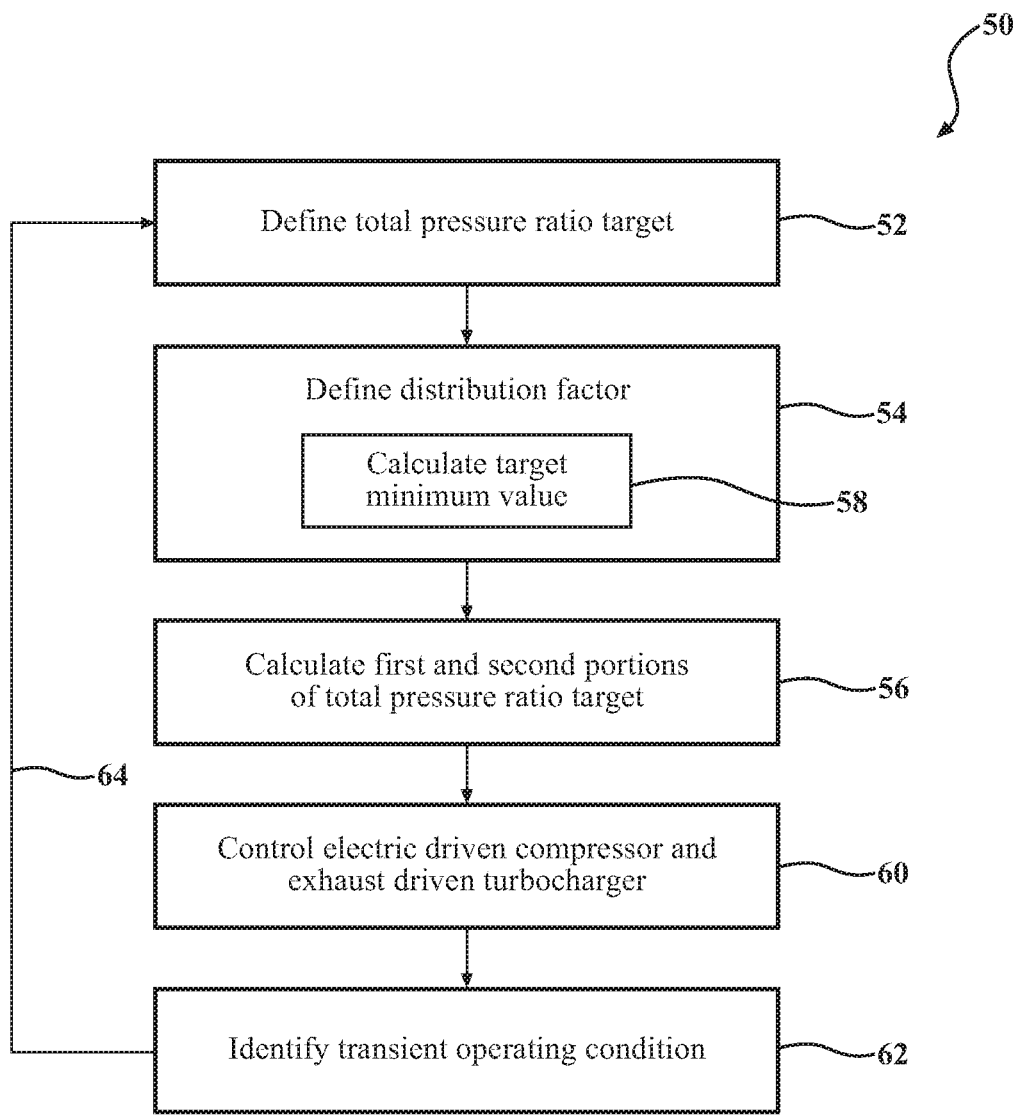
FIG. 2 is a flowchart showing a method of controlling the engine system.

Referring to FIG. 2, the combustion air control module 36 executes a method 50 of controlling the engine system 20. The method of controlling the engine system 20 includes defining a total pressure ratio target for the flow of combustion air 24. The step of defining the total pressure ratio target is generally indicated by box 52 in FIG. 2. The total pressure ratio target is the commanded amount of boost required for operation of the internal combustion engine 22 for the current operating conditions.

A distribution factor is also defined by the combustion air control module 36. The step of defining distribution factor is generally indicated by box 54 in FIG. 2. Because the electric driven compressor 28, under some circumstances, may not be able to provide all of the boost, i.e., all of the total pressure ratio target, the combustion air control module 36 may determine a target minimum value for the distribution factor, to limit the amount of boost required to be provided by the electric driven compressor 28. The step of determining the target minimum value for the distribution factor is generally indicated by box 58 in FIG. 2. The combustion air control module 36 would then define the distribution factor to include a value equal to or greater than the target minimum value for the distribution factor.

Determining the target minimum value for the distribution factor may include determining a maximum possible pressure ratio from the electric driven compressor 28 for a current air flow through the electric driven compressor 28. The combustion air control module 36 may determine the maximum possible pressure ratio achievable by the electric driven compressor 28 by referencing a table, e.g., a compressor map, stored in the memory of the controller 32. The compressor map relates air flow through the electric driven compressor 28 to the maximum possible pressure ratio from the electric driven compressor 28. The compressor map is a characteristic curve of each different compressor, which may be provided by the manufacturer of the electric driven compressor 28. The compressor map relates air flow and compression ratio to efficiency, whom which the combustion air control module 36 may derive the maximum possible compression ratio for a given air flow.

The target minimum value for the distribution factor may be calculated by the combustion air control module 36 from Equation 3 below.

$$\mu_{min} = \frac{\frac{\beta_{tot}}{\beta_{max}} - 1}{\beta_{tot}} \quad 3)$$

Referring to Equation 3, $\beta_{min}$ is the target minimum value for the distribution factor, $\beta_{tot}$ is the total pressure ratio target, and $\beta_{max}$ is the maximum possible pressure ratio from the electric driven compressor 28 for the current air flow through the electric driven compressor 28.

Figure 3:
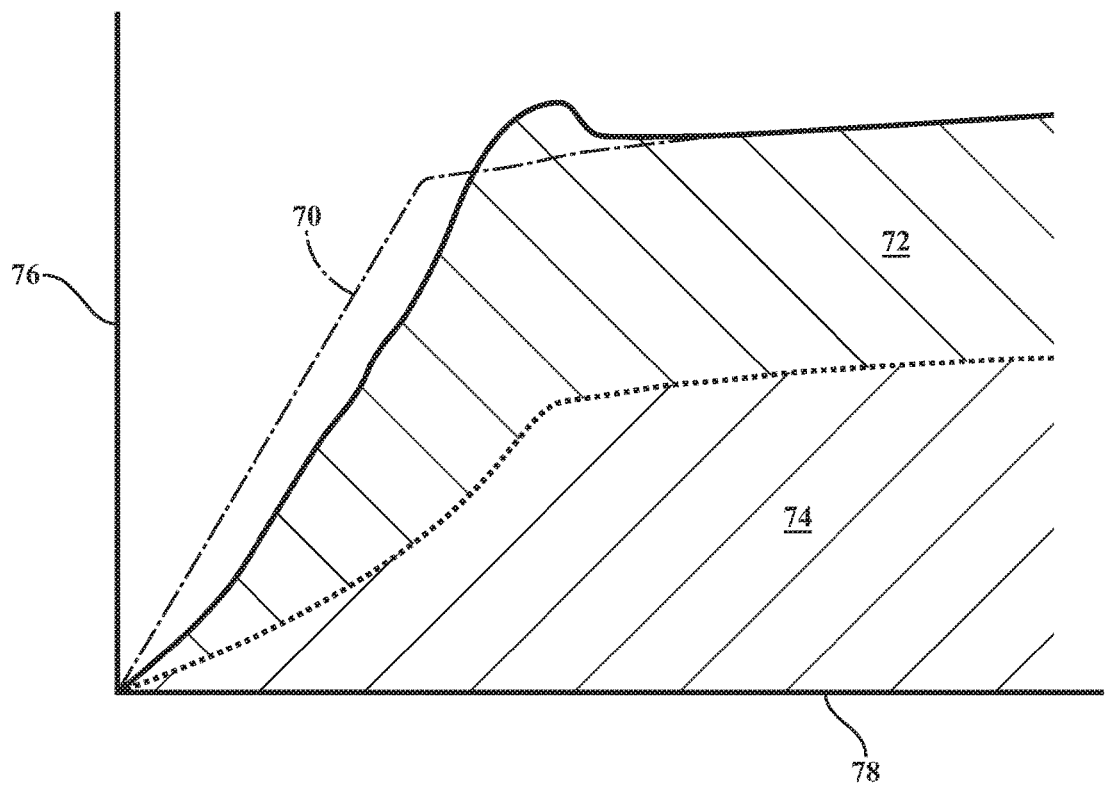
FIG. 3 is a graph showing a compression ratio of a flow combustion air over time.

The distribution factor is used to determine the amount of boost provided by each of the electric driven compressor 28 and the exhaust driven turbocharger 30 respectively. More specifically, the distribution factor is used to calculate a first portion of the total pressure ratio target and a second portion of the total pressure ratio target. The step of calculating the first and second portions is generally indicated by box 56 in FIG. 2. Referring to FIG. 3, once stabilized, the sum of the first portion of the total pressure ratio target and the second portion of the totalpressure ratio target is equal to the total pressure ratio target. The first portion of the total pressure ratio target is the amount of boost to be provided by the electric driven compressor 28, and the second portion of the total pressure target is the amount of boost to be provided by the exhaust driven turbocharger 30. As shown in FIG. 3, the pressure ratio is generally indicated along a vertical axis 76, and time is generally indicated along a horizontal axis 78, the total pressure ratio target is generally indicated by line 70, the first portion of the total pressure ratio target provided by the electric driven compressor 28 is generally indicated by a first hatched region 72, and the second portion of the total pressure ratio target provided by the exhaust driven turbocharger 30 is generally indicated by a second hatched region 74.

The distribution factor is defined to have a value equal to or greater than zero, and equal to or less than one. Furthermore, as noted above, the distribution factor is further defined to include a value that is greater than the target minimum value for the distribution factor. Accordingly, the distribution factor has a first limit equal to a value of one, and a second limit equal to a value of zero. The total pressure ratio target provided at the end of a transient vehicle operating condition is delivered by the exhaust driven turbocharger 30 when the distribution factor has a value equal to one. Accordingly, when the distribution actor is defined to have a value equal to one, the exhaust driven turbocharger 30 provides all of the boost. The total pressure ratio target provided at the end of a transient vehicle operating condition is delivered by the electric driven compressor 28 when the distribution factor has a value equal to zero. Accordingly, when the distribution factor has a value equal to zero, the electric driven compressor 28 provides all of the boost. A transient vehicle operating condition is defined herein as a change in vehicle operating condition. For example, vehicle acceleration may change the current vehicle operating conditions, necessitating a change or re-definition of the total pressure ratio target.

The second portion of the total pressure ratio target may be calculated by the combustion air control module 36 from Equation 1) below.

$$\beta_2 = \mu \cdot \beta_{tot} + 1 - \mu \quad \quad 1)$$

Referring to Equation 1, $\beta_2$ is the second portion of the total pressure ratio target provided by the exhaust driven turbocharger 30, $\beta_{tot}$ is the total pressure ratio target, and $\mu$ is the distribution factor.

The first portion of the total pressure ratio target may be calculated by the combustion air control module 36 from Equation 2 below.

$$\beta_1 = \frac{\beta_{tot}}{\beta_{act}} \quad \quad 2)$$

Referring to Equation 2, $\beta_1$ is the first portion of the total pressure ratio target provided by the electric driven compressor 28, $\beta_{tot}$ is the total pressure ratio target, and $\beta_{act}$ is the current pressure ratio being provided by the exhaust driven turbocharger 30.

Once the first portion and the second portion of the total pressure ratio target have been calculated, then the combustion air control module 36 may control the electric driven compressor 28 to provide the first portion of the total pressure ratio target, and control the exhaust driven turbocharger 30 to provide the second portion of the total pressure ratio target. The step of controlling the electric driven compressor 28 and the exhaust driven turbocharger 30 is generally indicated by box 60 in FIG. 2 The specific manner in which the electric driven compressor 28 and the exhaust driven turbocharger 30 are controlled to provide the required amount of boost from each, i.e., the first portion and the second portion of the total pressure ratio target respectively, is dependent upon the specific configuration and operation of the electric driven compressor 28 and the exhaust driven turbocharger 30, and are well known by those skilled in the art. As such, the specific manner in which the electric driven compressor 28 and the exhaust driven turbocharger 30 are controlled to provide the respective amount of boost is not described in detail herein.

The combustion air control module 36 continuously monitors the current operating conditions of the engine system 20 to identify a transient operating condition. The step of identifying a transient operating condition is generally indicated by box 62 in FIG. 2. When the combustion air control module 36 identifies a transient operating condition, generally indicated by arrow 64, then the combustion air control module 36 redefines the total pressure ratio target required to satisfy the operating requirements of the engine system 20 through the transient vehicle operating condition, and the distribution factor. As described above, the transient vehicle operating condition occurs when the operating conditions of the engine system 20 change, such as may occur during acceleration, deceleration, a change in terrain, etc.

As a result of redefining the distribution factor, the combustion air control module 36 further re-calculates the first portion of the total pressure ratio target and the second portion of the total pressure ratio target for each re-defined value of the distribution factor, and controls the electric driven compressor 28 and the exhaust driven turbocharger 30 to provide the re-defined first portion and second portion of the total pressure ratio target respectively.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling an engine system having both an electric driven compressor and an exhaust driven turbocharger for compressing a flow of combustion air for an internal combustion engine, the method comprising:
    defining a total pressure ratio target for the flow of combustion air;
    defining a distribution factor to calculate a first portion of the total pressure ratio target and a second portion of the total pressure ratio target, wherein the sum of the first portion of the total pressure ratio target and the second portion of the total pressure ratio target is equal to the total pressure ratio target;
    controlling the electric driven compressor to provide the first portion of the total pressure ratio target; and
    controlling the exhaust driven turbocharger to provide the second portion of the total pressure ratio target.

2. The method set forth in claim 1, further comprising continuously re-defining the distribution factor during a transient vehicle operating condition, wherein the transient vehicle operating condition includes redefining the total pressure ratio target.

3. The method set forth in claim 2, further comprising re-calculating the first portion of the total pressure ratio target and the second portion of the total pressure ratio target for each re-defined value of the distribution factor.

4. The method set forth in claim 1, wherein defining the distribution factor is further defined as defining the distribution factor to have a value equal to or greater than zero, and equal to or less than one.

5. The method set forth in claim 4, wherein the distribution factor has a first limit equal to a value of one, and a second limit equal to a value of zero, wherein the total pressure ratio target provided at the end of a transient vehicle operating condition is delivered by the exhaust driven turbocharger when the distribution factor has a value equal to one, and the total pressure ratio target provided at the end of a transient vehicle operating condition is delivered by the electric driven compressor when the distribution factor has a value equal to zero.

6. The method set forth in claim 4, wherein the second portion of the total pressure ratio target is calculated from the Equation below:

$$\beta_2 = \mu \cdot \beta_{tot} + 1 - \mu$$

wherein $\beta_2$ is the second portion of the total pressure ratio target provided by the exhaust driven turbocharger, $\beta_{tot}$ is the total pressure ratio target, and $\mu$ is the distribution factor.

7. The method set forth in claim 6, wherein the first portion of the total pressure ratio target is calculated from the Equation below;

$$\beta_1 = \frac{\beta_{tot}}{\beta_{act}}$$

wherein $\beta_1$ is the first portion of the total pressure ratio target provided by the electric driven compressor, $\beta_{tot}$ is the total pressure ratio target, and $\beta_{act}$ is the current pressure ratio being provided by the exhaust driven turbocharger.

8. The method set forth in claim 4, further comprising determining a target minimum value for the distribution factor.

9. The method set forth in claim 8, wherein defining the distribution factor is further defined as defining the distribution factor to include a value equal to or greater than the target minimum value for the distribution factor.

10. The method set forth in claim 8, wherein determining the target minimum value for the distribution factor includes determining a maximum possible pressure ratio from the electric driven compressor for a current air flow through the electric driven compressor.

11. The method set forth in claim 10, wherein determining the maximum possible pressure ratio from the electric driven compressor for the current air flow includes referencing a table that relates air flow through the electric driven compressor to the maximum possible pressure ratio from the electric driven compressor.

12. The method set forth in claim 10, wherein the target minimum value for the distribution factor is calculated from the Equation below:

$$\mu_{min} = \frac{\frac{\beta_{tot}}{\beta_{max}} - 1}{\beta_{tot}}$$

wherein $\mu_{min}$ is the target minimum value for the distribution factor, $\beta_{tot}$ is the total pressure ratio target, and $\beta_{max}$ is the maximum possible pressure ratio from the electric driven compressor for the current air flow through the electric driven compressor.

13. An engine system comprising:
an internal combustion engine operable to mix a flow of combustion air with a fuel, and generate a flow of exhaust gas from combustion of the combustion air and fuel mixture;
an electric driven compressor operable to use electric power to compress the flow of combustion air;
an exhaust driven turbocharger operable to use the flow of exhaust gas to compress the flow of combustion air; and
an engine control unit having a processor and a memory having a combustion air control module saved thereon, wherein the processor is operable to execute the combustion air control module to:
define a total pressure ratio target for the flow of combustion air;
define a distribution factor to calculate a first portion of the total pressure ratio target and a second portion of the total pressure ratio target, wherein the sum of the first portion of the total pressure ratio target and the second portion of the total pressure ratio target is equal to the total pressure ratio target;
control the electric driven compressor to provide the first portion of the total pressure ratio target; and
control the exhaust driven turbocharger to provide the second portion of the total pressure ratio target.

14. The engine system set forth in claim 13, wherein the combustion air control module is operable to define the distribution factor to have a value equal to or greater than zero, and equal to or less than one.

15. The engine system set forth in claim 14, wherein the distribution factor has a first limit equal to a value of one, and a second limit equal to a value of zero, wherein the total pressure ratio target provided at the end of a transient vehicle operating condition is delivered by the exhaust driven turbocharger when the distribution factor has a value equal to one, and the total pressure ratio target provided at the end of a transient vehicle operating condition is delivered by the electric driven compressor when the distribution factor has a value equal to zero.

16. The engine system set forth in claim 13, wherein the second portion of the total pressure ratio target is calculated from the Equation below:

$$\beta_2 = \mu \cdot \beta_{tot} + 1 - \mu$$

wherein $\beta_2$ is the second portion of the total pressure ratio target provided by the exhaust driven turbocharger, $\beta_{tot}$ is the total pressure ratio target, and $\mu$ is the distribution factor.

17. The engine system set forth in claim 13, wherein the first portion of the total pressure ratio target is calculated from the Equation below;

$$\beta_1 = \frac{\beta_{tot}}{\beta_{act}}$$

wherein $\beta_1$ is the first portion of the total pressure ratio target provided by the electric driven compressor, $\beta_{tot}$ is the total pressure ratio target, and $\beta_{act}$ is the current pressure ratio being provided by the exhaust driven turbocharger.

18. The engine system set forth in claim 13, wherein the combustion air control module is operable to determine a target minimum value for the distribution factor.

19. The engine system set forth in claim 18, wherein the combustion air control module is operable to reference a table saved in the memory of the engine control unit that relates air flow through the electric driven compressor to the maximum possible pressure ratio from the electric driven compressor to determine a maximum possible pressure ratio from the electric driven compressor for a current air flow through the electric driven compressor.

20. The engine system set forth in claim 19, wherein the target minimum value for the distribution factor is calculated from the Equation below:

$$\mu_{min} = \frac{\frac{\beta_{tot}}{\beta_{max}} - 1}{\beta_{tot}}$$

wherein $\mu_{min}$ is the target minimum value for the distribution factor, $\beta_{tot}$ is the total pressure ratio target, and $\beta_{max}$ is the maximum possible pressure ratio from the electric driven compressor for the current air flow through the electric driven compressor.

* * * * *